(12) United States Patent
Choi et al.

(10) Patent No.: US 9,453,773 B2
(45) Date of Patent: Sep. 27, 2016

(54) CAPACITIVE TYPE 6-AXIAL FORCE/TORQUE SENSOR

(71) Applicant: Research & Business Foundation SUNGKYUNKWAN UNIVERSITY, Suwon-si (KR)

(72) Inventors: Hyouk Ryeol Choi, Gunpo-si (KR); Dong Hyuk Lee, Cheongju-si (KR); Ui Kyum Kim, Anseong-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/680,500

(22) Filed: Apr. 7, 2015

(65) Prior Publication Data

US 2015/0292969 A1    Oct. 15, 2015

(30) Foreign Application Priority Data

Apr. 14, 2014 (KR) .................. 10-2014-0044206

(51) Int. Cl.
| | | |
|---|---|---|
| *G01D 7/00* | (2006.01) | |
| *G01L 5/16* | (2006.01) | |
| *G01L 3/10* | (2006.01) | |

(52) U.S. Cl.
CPC ............... *G01L 5/165* (2013.01); *G01L 3/106* (2013.01)

(58) Field of Classification Search
CPC ................................ G01L 5/165; G01L 3/106
USPC ........................... 73/780, 862.041, 862.337
See application file for complete search history.

(56) References Cited

U.S. PATENT DOCUMENTS

| | | | | |
|---|---|---|---|---|
| 4,563,683 A | * | 1/1986 | Tanaka ................ | G01D 5/2415 324/660 |
| 4,864,463 A | * | 9/1989 | Shkedi .................. | G01L 19/02 361/283.4 |
| 5,343,765 A | | 9/1994 | Okada | |
| 6,508,125 B2 | * | 1/2003 | Otani .................. | G01P 15/0888 73/514.32 |
| 6,530,283 B2 | * | 3/2003 | Okada .................... | G01L 5/165 73/780 |
| 6,933,732 B2 | * | 8/2005 | Morimoto ............... | G01L 1/142 324/661 |
| 6,989,677 B2 | * | 1/2006 | Morimoto ............. | G06F 3/0338 324/660 |
| 7,119,552 B2 | * | 10/2006 | Morimoto ............... | G01L 1/144 324/661 |
| 7,784,366 B2 | * | 8/2010 | Daverman .............. | G01L 1/142 73/780 |
| 7,888,840 B2 | * | 2/2011 | Shimaoka .............. | H04R 19/04 310/309 |

FOREIGN PATENT DOCUMENTS

JP             08-082638         3/1996

* cited by examiner

*Primary Examiner* — Max Noori

(57) ABSTRACT

A capacitive type sensor includes a circuit board, electrodes formed on a first surface of the circuit board, and an electrode plate disposed above the circuit board, wherein the electrodes comprise pairs of electrodes disposed from a distance from a center of the circuit board, and the pairs of electrodes being spaced apart from each other.

20 Claims, 8 Drawing Sheets

FIG 6

|       | cell-1 | cell-2 | cell-3 | cell-4 | cell-5 | cell-6 |
|-------|--------|--------|--------|--------|--------|--------|
| $F_x$ | -      | +      | +      | -      | +      | -      |
| $F_y$ | .      | .      | -      | +      | +      | -      |
| $F_z$ | -      | -      | -      | -      | -      | -      |
| $M_x$ | -      | -      | +      | +      | +      | +      |
| $M_y$ | .      | .      | -      | -      | +      | +      |
| $M_z$ | +      | -      | +      | -      | +      | -      |

CAPACITIVE TYPE 6-AXIAL FORCE/TORQUE SENSOR

CROSS-REFERENCE TO RELATED APPLICATION

This application claims the benefit of priority under 35 U.S.C. §119(a) of Korean Patent Application No. 10-2014-0044206, filed on Apr. 14, 2014, in the Korean Intellectual Property Office, the entire disclosure of which is incorporated herein by reference for all purposes.

BACKGROUND

1. Field

The following description relates to a capacitive type 6-axial force/torque sensor for measuring a moment and multi-axial force exerting on a point in space, using variations in capacitance.

2. Description of Related Art

Force exerting on a point in space may be fully described as 6 components, 3-axial force and 3-axial torque. Depending on the fields of applications, a 6-axial force sensor measuring all of the components or a 3-axial force sensor only measuring 3-axial force may be used.

A majority of multi-axial force/torque sensors may be resistive type sensors using strain gauges, and a portion of the sensors may be optical type sensors using photodiodes/phototransistors.

In the resistive type sensors, a strain gauge may be attached to a certain portion of a 3-dimensional elastic structure to measure force using variations in resistance generated in the strain gauge when the elastic structure is deformed. In the optical type sensors, force is measured by using a difference in distances between a light emitting unit (a photodiode) and a light receiving unit (a phototransistor) generated by external force.

The main drawbacks of such types may be difficulties in assembly, and the consequent increase in costs. It may be rarely feasible to automate the attachment of several strain gauges or optical devices to the 3-dimensional elastic structure in terms of operational characteristics, and the attachment may necessarily require a manual labor from a skilled person. In addition, due to the manual assembling, reactions of respective sensors may not be uniform, resulting in an increase in product quality management costs.

As a result, due to a relatively high price three or more axial force/torque sensors have not been widely used in the fields of applications requiring a force measuring sensor such as, for example, a robot.

Accordingly, the development of sensors capable of measuring multi-axial force and multi-axial torque has been required. A Related Art Document is Korean Patent Laid Open Publication No. 10-2012-0119172. All documents cited in the present disclosure, including published documents, patent applications, and patents, may be incorporated herein in their entirety by reference in the same manner as when each cited document is separately and specifically incorporated or incorporated in its entirety.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect there is provided a 6-axial force/torque sensor using capacitance that is capable of being manufactured in a simple structure.

According to another aspect there is provided a 6-axial force/torque sensor having a structure capable of preventing a stress-relaxation phenomenon of a dielectric material.

According to another aspect there is provided a capacitive type sensor including a circuit board, electrodes formed on a first surface of the circuit board, and an electrode plate disposed above the circuit board, wherein the electrodes comprise pairs of electrodes disposed from a distance from a center of the circuit board, and the pairs of electrode being spaced apart from each other.

The electrodes may include three pairs of electrodes forming an angle of 120 degrees between each pair of the electrode at the center of the circuit board.

The electrodes may include four pairs of electrodes forming an angle of 90 degrees between each pair of the electrodes at the center of the circuit board.

The electrodes may include six pairs of electrodes forming an angle of 60 degrees between each pair of the electrodes at the center of the circuit board.

The electrode plate may be formed of a metal and is ground to the outside.

Grooves may be formed to correspond to the electrodes on a surface of the electrode plate facing the circuit board.

The capacitive type sensor may include an elastic structure fixing the electrode plate such that the electrode plate is spaced apart from the circuit board.

The capacitive type sensor may include: a dielectric body applied to the first surface of the circuit board on which the electrodes are formed.

A size of the electrode plate may correspond to a size of the circuit board.

The capacitive type sensor may be configured to measure externally applied force or torque based on variations in capacitance between the electrodes and the electrode plate.

The circuit board may be a circular circuit board and the pairs of the electrodes may be radially disposed from a distance from a center of the circular circuit board to near a circumference of the circular circuit board.

The pairs of electrodes may be disposed at an equal distance from the center of the circuit board.

The capacitive type sensor may include: an air gap may be formed between the first surface of the circuit board and the electrode plate.

The electrodes may have rectangular shape.

The capacitive type sensor may be a 6-axial force/torque sensor.

The pairs of electrodes are spaced apart from each other to divide the circuit board into equal parts.

According to another aspect, there is provided a capacitive type sensor including a circular circuit board, electrodes formed on a first surface of the circular circuit board, a circular electrode plate disposed above the circular circuit board and an air gap formed between the first surface of the circular circuit board and the circular electrode plate, wherein the electrodes comprise pairs of linear electrodes disposed along radii of the circular circuit board, and the pairs of linear electrode being spaced apart from each other to divide the circular circuit board into equal parts.

The pairs of the linear electrodes may be disposed at a distance from a center of the circular circuit board.

A depth of the air gap may be adjustable based on a magnitude of a force or torque that is expected to be applied to the sensor.

The capacitive type sensor may include: a dielectric body applied to the first surface of the circular circuit board on which the electrodes are formed.

Other features and aspects will be apparent from the following detailed description, the drawings, and the claims.

BRIEF DESCRIPTION OF THE DRAWINGS

FIG. 6 is a table illustrating examples of variations in capacitance depending on the relative variations of the electrodes of FIG. 5.

Figure 1:
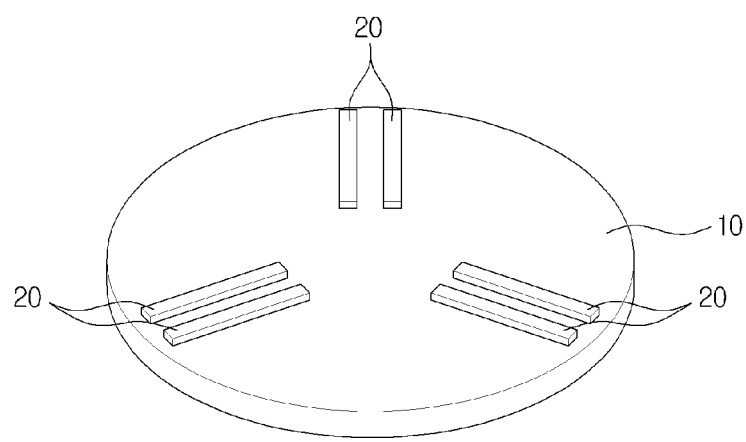
FIG. 1 is a diagram illustrating an example of a circuit board.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a circuit board. Referring to FIG. 1, a circuit board 10 may have electrodes 20 formed on an upper portion. The electrodes 20 may comprise pairs of electrodes formed on points situated at a distance from the center of the circuit board 10, and be formed to be spaced apart from one another.

Preferably, the circuit board 10 may have circular shape as illustrated in FIG. 1. The pairs of electrodes radially formed from points situated at a distance from the center of the circular circuit board 10, and be formed to be spaced apart from one another such that they are divided into equal parts with intervals of a predetermined angle in a circumferential direction.

The electrodes 20 may not be formed within a circular region having a predetermined radius from the center of the circuit board 10. As illustrated in FIG. 1, the electrodes may not be formed within a circular, inner concentric region of the circuit board 10.

In a non-exhaustive example, the circuit board 10 illustrated in FIG. 1 may include three pairs of electrodes 20. The three pairs of electrodes 20 may divide the circuit board 10 into equal parts with intervals of 120 degrees. The number of electrodes are not limited to three pairs of electrodes, and other number and configuration of electrodes are considered to be well within the scope of the present disclosure. The circuit board 10 may include additional pairs of electrodes to increase a degree of sensitivity in measurements. Preferably, electrodes 20 may be linear electrodes having a rectangular shape as illustrated in FIG. 1, but any other type of electrode may be used instead.

The electrodes may be connected to a separate sensor chip (not shown), and the sensor chip may be disposed in a region in which the electrodes are not formed on the circuit board 10. In another configuration, the sensor chip may be disposed outside the circuit board 10.

A wiring connecting the electrode and the sensor chip may be formed to be coplanar with the circuit board 10 in order to reduce the influence of external factors, and thus, the sensor chip may be disposed in a region where the electrodes are not formed on the circuit board 10.

Figure 2:
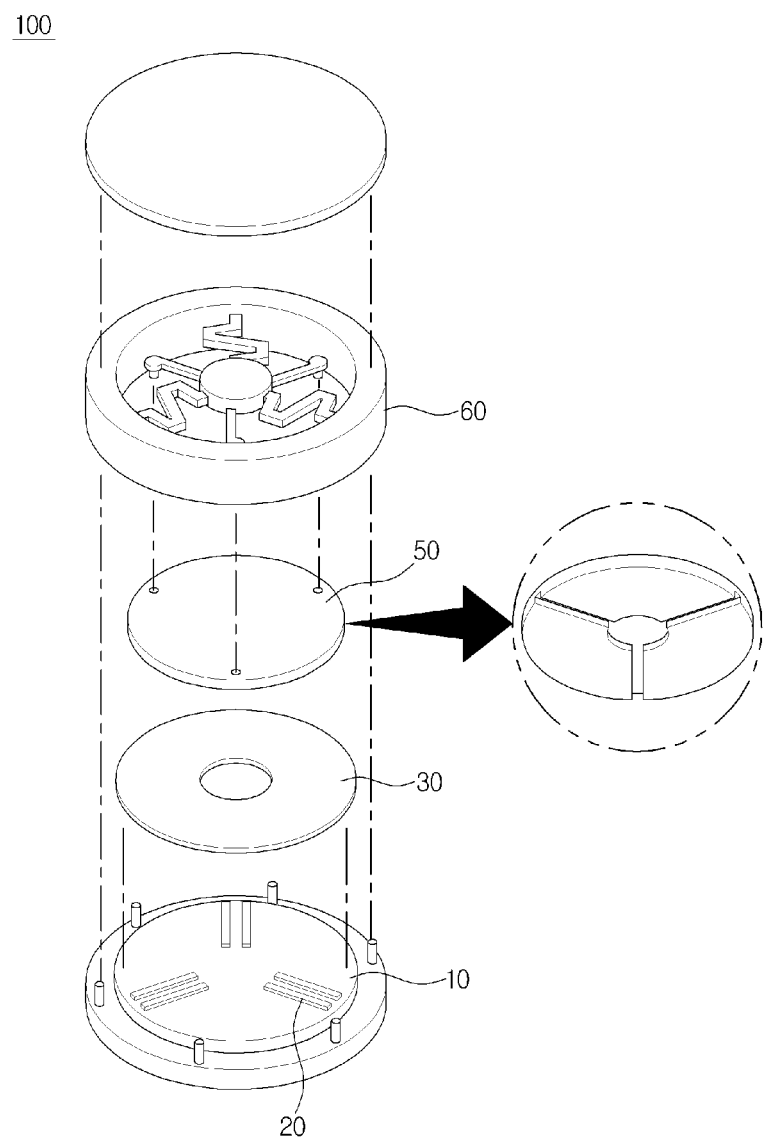
FIG. 2 is a diagram illustrating an example of a capacitive type 6-axial force/torque sensor.

FIG. 2 is a diagram illustrating an example of a capacitive type 6-axial force/torque sensor.

Referring to FIG. 2, a capacitive type 6-axial force/torque sensor 100 may include the circuit board 10, the electrodes 20 formed on the upper portion of the PCB 10, a dielectric body 30 applied to a surface of the circuit board 10 on which the electrodes are formed, and a electrode plate 50. The electrode plate 50 may be disposed above the PCB 10.

The PCB 10 and the electrodes 20 may be identical to those described with reference to FIG. 1. The description of FIG. 1 is also applicable to FIG. 2, and thus will not be repeated here.

The dielectric body 30 may be formed as a sheet that is uniformly applied to the surface of the circuit board 10. The dielectric body 30 helps to accurately measure a minor change in levels of capacitance by increasing the level of capacitance formed between the electrode and the electrode plate.

The electrode plate 50 may serve as an electrode corresponding to the electrodes 20 formed on the circuit board 10. Grooves may be formed on the electrode plate 50 in positions corresponding to those of the electrodes on a surface of the electrode plate 50 facing the circuit board 10. The electrode plate 50 may be formed of a metal in order to serve as an electrode and be externally grounded to serve as a standard for calibrating capacitance.

The circuit board 10 and the electrode plate 50 may be spaced apart from each other by a predetermined distance to form an air gap to reduce a stress relaxation phenomenon of the dielectric body 30.

The stress relaxation phenomenon is a phenomenon in which a stress level within an object is reduced over time when instantaneously decreased deformation is constantly maintained. The stress relaxation may be generated due to the coexistence of elasticity and viscosity in the object, and an air gap may serve to remove the stress relaxation in the dielectric body due to repeatedly, externally applied force.

A thickness of the air gap may be determined in consideration of a magnitude of external force exerted onto the sensor and may be differently formed depending on a magnitude of force or torque expected to be applied to the sensor or a required extent of tolerance.

In a case in which a relatively large magnitude of force is expected to be applied or a sensor capable of measuring increased force needs to be manufactured, the thickness of the air gap may be preferably increased.

When the thickness of the air gap is decreased in consideration of variations in capacitance depending on a distance, the level of capacitance may be increased. When the thickness of the air gap is has predetermined size or less, the electrode plate and the dielectric body may come into contact with each other, whereby the stress relaxation phenomenon of the dielectric body due to external force may influence outputs of the sensor. Thus, the thickness of the air gap may be determined on the basis of the abovementioned condition.

In addition, a capacitive type 6-axial force/torque sensor may further include an elastic structure 60 fixing the electrode plate such that the electrode plate is spaced apart from the PCB 10 by a predetermined distance. In addition, a plate serving as a cover part of the elastic structure may be inserted into an upper portion of the elastic structure 60.

Figure 3:
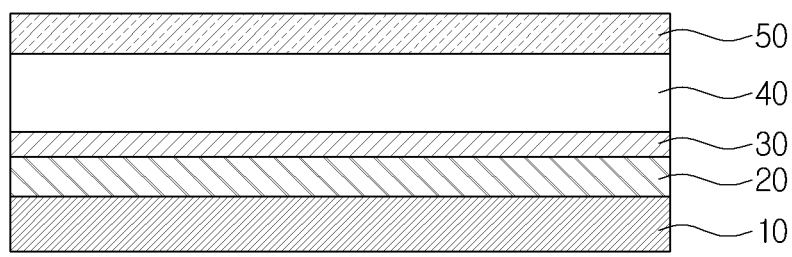
FIG. 3 is a diagram illustrating an example of the capacitive type 6-axial force/torque sensor.

FIG. 3 is a diagram illustrating an example of the capacitive type 6-axial force/torque sensor.

Referring to FIG. 3, the capacitive type 6-axial force/torque sensor may include the circuit board 10, the electrodes 20, the dielectric body 30, an air gap 40 and the electrode plate 50. In this case, the elastic structure 60 fixing the electrode plate is not illustrated.

A cross-sectional shape of an electrode formation region of the capacitive type 6-axial force/torque sensor is illustrated as in FIG. 3 and as described above, it could be understood that a direction and a magnitude of applied external force may be measured using variations in capacitance depending on a change in distance between the electrode plate and the electrode. Such a method will be described in detail with reference to FIGS. 4A and 4B.

Figure 4A:
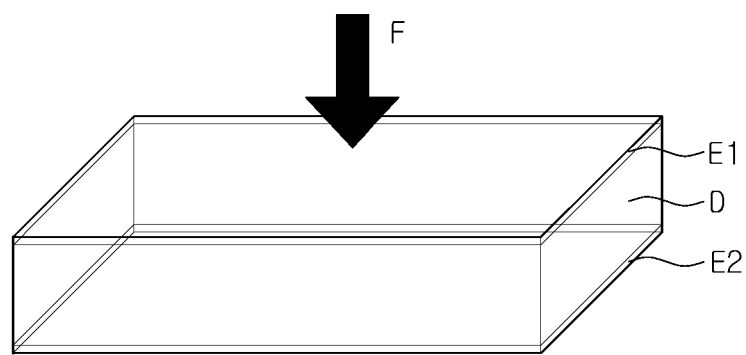
FIGS. 4A and 4B are diagrams illustrating examples of variations in capacitance by external force.
Figure 4B:
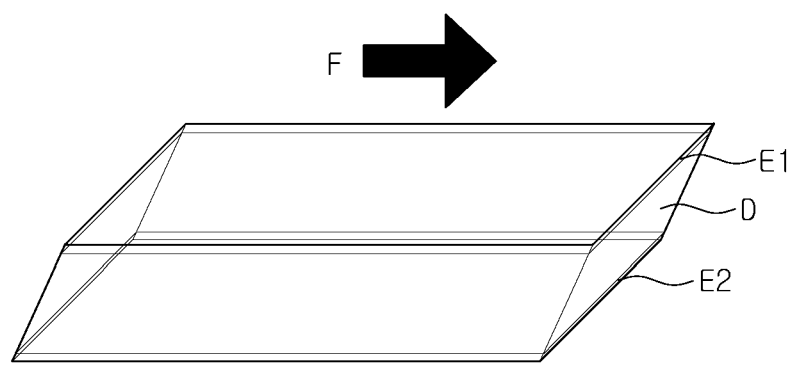

FIGS. 4A and 4B are diagram illustrating examples of variations in capacitance by external force.

The capacitive type 6-axial force/torque sensor measure a magnitude and a direction of externally applied force or torque using variations in capacitance depending on a change in distance between the electrodes. FIGS. 4A and 4B illustrate such a principle.

FIGS. 4A and 4B illustrate variations in capacitance due to normal force and variations in capacitance due to shear force.

Referring to FIG. 4A, an upper electrode E1 and a lower electrode E2 formed on upper and lower portions of a dielectric body D. The upper electrode E1 and the lower electrode E2 may correspond to the electrode plate and the electrodes formed on the circuit board 10 in the capacitive type 6-axial force/torque sensor.

The dielectric body D may be a dielectric substance that may be deformed by external force but returns to an initial state when the external force is removed. When the shape of the dielectric body is changed by external force, a distance between the upper electrode E1 and the lower electrode E2 may be changed, and the change in distance may increase with an increase in external force.

When a potential difference between the upper electrode E1 and the lower electrode E2 is generated, electric charges are accumulated on the electrodes, and a level of capacitance may be calculated by dividing the amount of the charges by voltage, as shown in Formula 1 below:

$$C = \frac{\varepsilon E A}{d} \quad \text{[Formula 1]}$$

here, C is capacitance, d is a distance between the electrodes, E is a dielectric constant of the dielectric body, and A is a facing area between the electrodes. As shown in Formula 1, the capacitance value may change depending on the distance between the electrodes.

Meanwhile, in FIG. 4B, when shear force is applied, distortion occurs in the dielectric body D due to decrease of the facing area between the upper electrode E1 and the lower electrode E2. Accordingly, the capacitance value may be reduced and a degree of externally applied shear force may be derived using variations in capacitance.

The capacitive sensors disclose in the non-exhaustive examples are characterized by measuring variations in the capacitance value between the electrode plate 50 and the electrodes 20 formed on the circuit board 10 to derive a degree of external force applied to the force/torque sensor depending on the variations in the capacitance value.

Figure 5A:
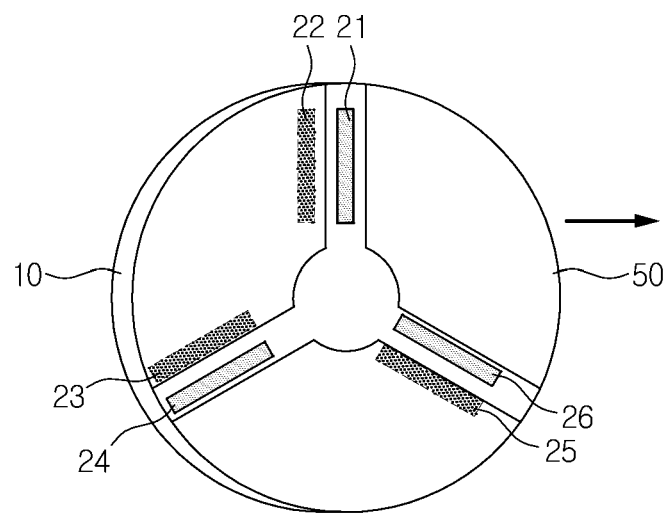
FIGS. 5A through 5C are diagram illustrating examples of relative variations of electrodes depending on directions of external force applied to the capacitive type 6-axial force/torque sensor.
Figure 5B:
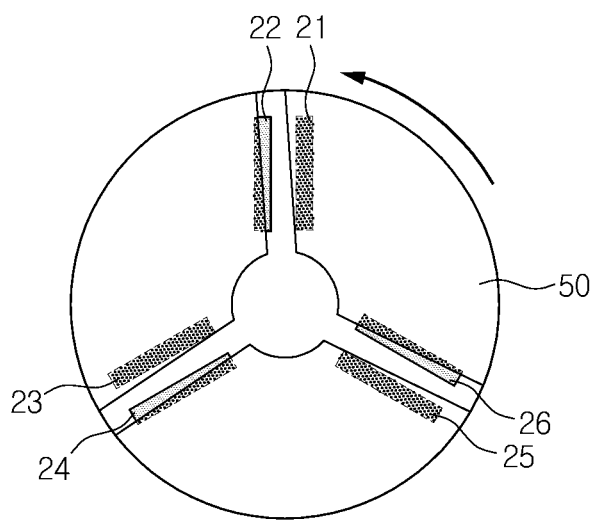
Figure 5C:
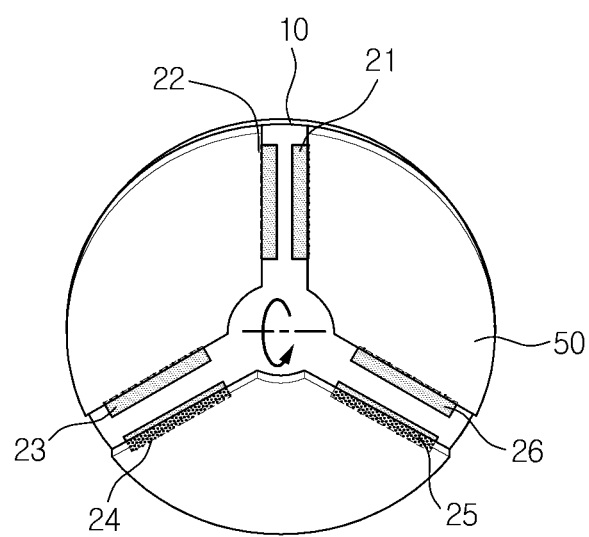

FIGS. 5A through 5C are diagram illustrating examples of relative variations of electrodes depending on directions of external force applied to the capacitive type 6-axial force/torque sensor. For ease of understanding, electrodes formed on the circuit board 10 are referred to as first to sixth electrodes, 21, 22, 23, 24, 25, and 26.

In order to explain external force directions based on 3-axes, a direction from the left to the right is defined as a (+) x-axis, a direction from the front to the rear is defined as a (+) y-axis, and a direction from the bottom to the top is defined as a (+) z-axis.

FIGS. 5A through 5C illustrate relative changes of the electrodes when a force $F_x$ in an x-axis direction, a moment $M_z$ with respect to the z-axis and a moment $M_x$ with respect to the x-axis are exerted.

Referring to FIG. 5A, relative positional changes of the electrodes when force in the x-axis direction is exerted is shown. When external force or torque is applied, the PCB 10 may be maintained in a fixed state, and relative change in the position of the electrodes may be generated by the movement of the electrode plate 50.

Thus, when force in the x-axis direction is exerted, the electrode plate 50 is tilted in the right direction and relative positional changes of the electrodes may occur as illustrated in FIG. 5A. The electrode plate 50 may be distant from the first electrode 21, the fourth electrode 24, and the sixth electrode 26, such that capacitance levels in electrodes 21, 24, and 26 may be decreased.

When the force in the x-axis direction is exerted, the electrode plate 50 may be closer to the second electrode 22, the third electrode 23, and the fifth electrode 25, such that capacitance levels in electrodes 22, 23, and 25 may be increased.

Referring to FIG. 5B, moment $M_z$ with respect to the z-axis is exerted. The moment $M_z$ may be generated when distortion occurs in a counterclockwise direction based on the (+) z-axis. In this case, since a facing area of the electrode plate 50 with respect to the first electrode 21, the third electrode 23, and the fifth electrode 25 may be increased, capacitance levels in electrodes 21, 23, and 25 may be increased.

Since a facing area of the electrode plate 50 with respect to the second electrode 22, the fourth electrode 24, and the sixth electrode 26 may be reduced, capacitance levels in electrodes 22, 24, and 26 may be decreased.

FIG. 5(*c*) refers to a case when moment $M_x$ with respect to the x-axis is exerted. In this case, since the electrode plate 50 may be distorted in a counterclockwise direction based on the x-axis with respect to the circuit board, the electrode plate 50 may be closer to the third to sixth electrodes 23, 24, 25, and 26, such that capacitance levels in electrodes 23, 24, 25, and 26 may be increased.

Since the electrode plate 50 is away from the first electrode 21 and the second electrode 22, capacitance levels in the corresponding electrode 21 and 22 may be decreased.

FIG. 6 shows a table illustrating examples of variations in capacitance depending on the relative variations of the electrodes of FIG. 5.

The column of the table illustrated in FIG. 6 may refer to forces and moments in x-axis, y-axis, and z-axis directions, and Cells 1 to Cell 6 in a row end may refer to electrode cells formed by the first to sixth electrodes and the electrode part. In the table, "+" and "−" may refer to a relative increase and a relative decrease of capacitance, respectively. The symbol "·" denotes that a meaningful variation in capacitance is not present.

Although only relative variations in capacitance are illustrated, different methods of quantitatively measuring capacitance levels between the electrode plate 50 and the first to sixth electrodes are considered to be well within the scope of the present disclosure. For example, in consideration of the variations in capacitance as described above, the distance changes between the electrodes or the variations in the facing area may be estimated through the variations in capacitance in the 6-axial force/torque sensor. A direction and a magnitude of external force and torque exerted to the 6-axial force/torque sensor may be calculated using the measured distances and variations in facing area.

Figure 7A:
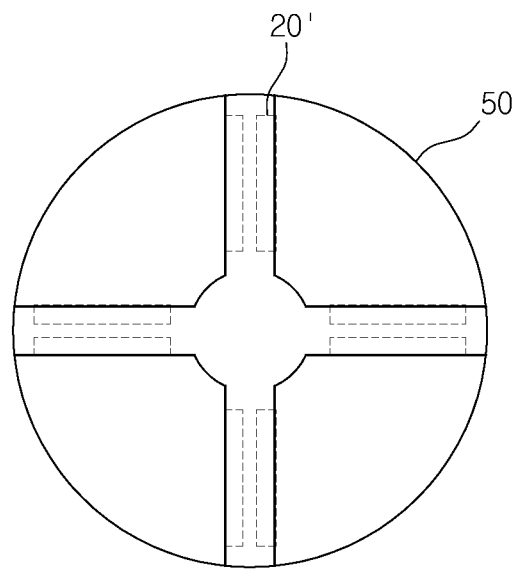
FIGS. 7A and 7B are diagrams illustrating examples of shapes of electrodes.
Figure 7B:
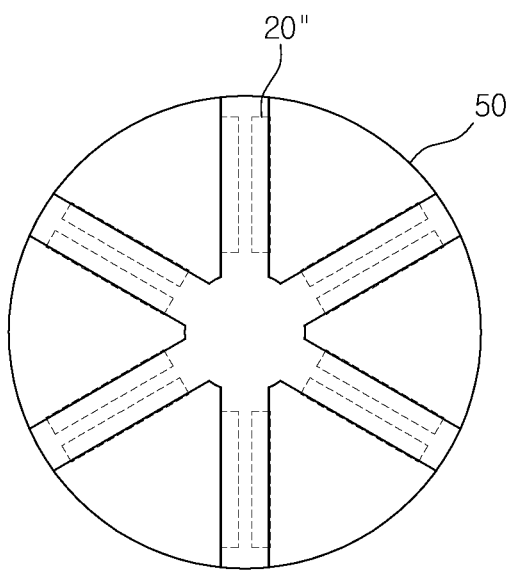

FIGS. 7A and 7B are diagrams illustrating examples of shapes of electrodes.

FIG. 7A illustrates four pairs of electrodes 20' dividing the electrode plate 50 into four equal parts with intervals of 90 degrees. FIG. 7B illustrates six pairs of electrodes 20" dividing the electrode plate 50 into six equal parts with intervals of 60 degrees. Other number and arrangement of electrodes may be used without departing from the spirit and scope of the illustrative examples described.

For example, as shown in FIGS. 1 to 4, the electrodes may be formed of three pairs of electrodes divided into three equal parts at intervals of 120 degrees. Such a shape of the electrodes may allow a direction and a magnitude of external force to be measured through the measurement of relative variations in capacitance in the first to sixth electrodes, as illustrated in FIG. 4. When using electrodes divided into further increased units, a degree of measurement accuracy may be increased because regions covered by the respective electrodes may be limited to narrowed regions.

As set forth above, according to examples described above, a capacitive type 6-axial force/torque sensor using capacitance, capable of being manufactured in a simple structure is provided.

Further, a 6-axial force/torque sensor having a structure capable of preventing a stress-relaxation phenomenon of a dielectric material is provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A capacitive type sensor comprising:
   a circuit board;
   electrodes formed on a first surface of the circuit board; and
   an electrode plate disposed above the circuit board,
   wherein the electrodes comprise N pairs of linear electrodes disposed along radii of the circuit board, and the N pairs of linear electrodes are spaced apart from each other at intervals of 360°/N along the radii of the circuit board,
   wherein N is an integer which is 3 or more.

2. The capacitive type sensor of claim 1, wherein the electrodes comprise three pairs of electrodes forming an angle of 120 degrees between each pair of the electrodes around the center of the circuit board.

3. The capacitive type sensor of claim 1, wherein the electrodes comprise four pairs of electrodes forming an angle of 90 degrees between each pair of the electrodes around the center of the circuit board.

4. The capacitive type sensor of claim 1, wherein the electrodes comprise six pairs of electrodes forming an angle of 60 degrees between each pair of the electrodes around the center of the circuit board.

5. The capacitive type sensor of claim 1, wherein the electrode plate is formed of a metal and is ground to the outside.

6. The capacitive type sensor of claim 1, wherein grooves are formed to correspond to the electrodes on a surface of the electrode plate facing the circuit board.

7. The capacitive type sensor of claim 1, further comprising an elastic structure fixing the electrode plate such that the electrode plate is spaced apart from the circuit board.

8. The capacitive type sensor of claim 1, further comprising a dielectric body applied to the first surface of the circuit board on which the electrodes are formed.

9. The capacitive type sensor of claim 1, wherein a size of the electrode plate corresponds to a size of the circuit board.

10. The capacitive type sensor of claim 1, wherein the capacitive type sensor is configured to measure externally applied force or torque based on variations in capacitance between the electrodes and the electrode plate.

11. The capacitive type sensor of claim 1, wherein the circuit board is a circular circuit board and the pairs of the electrodes are radially disposed from a distance from a center of the circular circuit board to near a circumference of the circular circuit board.

12. The capacitive type sensor of claim 1, wherein the pairs of electrodes are disposed at an equal distance from the center of the circuit board.

13. The capacitive type sensor of claim 8, further comprising an air gap is formed between the dielectric body and the electrode plate.

14. The capacitive type sensor of claim 1, wherein the electrodes have rectangular shape.

15. The capacitive type sensor of claim 1, wherein the capacitive type sensor is a 6-axial force/torque sensor.

16. The capacitive type sensor of claim 1, wherein the pairs of electrodes are spaced apart from each other to divide the circuit board into equal parts.

17. A capacitive type sensor comprising:
a circular circuit board;
electrodes formed on a first surface of the circular circuit board;
a circular electrode plate disposed above the circuit board; and
an air gap formed between the first surface of the circular circuit board and the circular electrode plate,
wherein the electrodes comprise N pairs of linear electrodes disposed along radii of the circular circuit board, and the N pairs of linear electrode are spaced apart from each other to divide the circular circuit board into N equal parts,
wherein N is an integer which is 3 or more.

18. The capacitive type sensor of claim 17, wherein the pairs of the linear electrodes are disposed at a distance from a center of the circular circuit board.

19. The capacitive type sensor of claim 17, wherein a depth of the air gap is adjustable based on a magnitude of a force or torque that is expected to be applied to the sensor.

20. The capacitive type sensor of claim 17, further comprising a dielectric body applied to the first surface of the circular circuit board on which the electrodes are formed.

* * * * *